(12) United States Patent
Gattis et al.

(10) Patent No.: US 7,533,059 B2
(45) Date of Patent: May 12, 2009

(54) PURCHASING USING A PHYSICAL OBJECT

(75) Inventors: Jeffrey Alton Gattis, Seattle, WA (US); Dana Lu Silverstein, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/686,290

(22) Filed: Mar. 14, 2007

(65) Prior Publication Data

US 2008/0228636 A1   Sep. 18, 2008

(51) Int. Cl.
*G06Q 40/00* (2006.01)
*G06Q 30/00* (2006.01)
*G06F 17/30* (2006.01)

(52) U.S. Cl. .............................. 705/40; 705/26; 705/27

(58) Field of Classification Search ...................... 726/9; 705/26, 27, 65, 76; 340/572.1, 568.5, 5.32, 340/5.6; 379/114.03; 455/406
See application file for complete search history.

(56) References Cited

U.S. PATENT DOCUMENTS

| | | | |
|---|---|---|---|
| 6,549,933 B1 * | 4/2003 | Barrett et al. ............... | 709/203 |
| 6,751,736 B1 * | 6/2004 | Bowman et al. ............ | 713/189 |
| 6,791,530 B2 * | 9/2004 | Vernier et al. .............. | 345/156 |
| 7,054,840 B1 * | 5/2006 | Foth et al. ................... | 705/57 |
| 7,103,576 B2 * | 9/2006 | Mann et al. .................. | 705/64 |
| 7,327,376 B2 * | 2/2008 | Shen et al. .................. | 345/676 |
| 2001/0042042 A1 * | 11/2001 | Stokes et al. ................. | 705/42 |
| 2002/0002514 A1 * | 1/2002 | Kamachi et al. ............. | 705/27 |
| 2002/0007319 A1 * | 1/2002 | Yu ............................. | 705/26 |
| 2002/0055906 A1 * | 5/2002 | Katz et al. .................. | 705/39 |
| 2002/0152273 A1 * | 10/2002 | Pradhan et al. ............. | 709/206 |
| 2002/0185981 A1 * | 12/2002 | Dietz et al. ............. | 315/169.3 |
| 2002/0194604 A1 * | 12/2002 | Sanchez et al. .............. | 725/60 |
| 2003/0018541 A1 * | 1/2003 | Nohr ........................... | 705/26 |
| 2003/0095141 A1 * | 5/2003 | Shah et al. .................. | 345/735 |

(Continued)

FOREIGN PATENT DOCUMENTS

WO    WO0054177    9/2000

(Continued)

OTHER PUBLICATIONS

TDB-ACC-No. NNRD454181 Disclosure Title: BluePayz : A Seamless Payment Method Using Bluetooth-Enabled Mobile Phones.*

(Continued)

*Primary Examiner*—Daniel S Felten
*Assistant Examiner*—William E Rankins
(74) *Attorney, Agent, or Firm*—Workman Nydegger

(57) ABSTRACT

Using a user interface to allow payment for physical or virtual goods to be made through a physical object. A method may be practiced in a computing system including a user interface. The method includes detecting a payment physical object, and payment capabilities associated with the payment physical object. User input is received. The user input includes at least one of physically dragging a physical object to the detected physical object, or graphically dragging the physical or a virtual object to the detected payment physical object by dragging a graphical representation of the physical or the virtual object to the detected payment physical object. Payment for the physical or virtual object is facilitated using the payment capabilities associated with the payment physical object.

15 Claims, 2 Drawing Sheets

U.S. PATENT DOCUMENTS

| | | | |
|---|---|---|---|
| 2003/0139974 A1* | 7/2003 | Lee | 705/26 |
| 2003/0178485 A1* | 9/2003 | Lee | 235/435 |
| 2004/0215963 A1* | 10/2004 | Kaplan | 713/172 |
| 2005/0017068 A1* | 1/2005 | Zalewski et al. | 235/380 |
| 2005/0052427 A1* | 3/2005 | Wu et al. | 345/173 |
| 2006/0001650 A1* | 1/2006 | Robbins et al. | 345/173 |
| 2006/0143021 A1* | 6/2006 | Vilmos | 705/1 |
| 2006/0178968 A1* | 8/2006 | Jung et al. | 705/35 |
| 2006/0248397 A1* | 11/2006 | Johnsen et al. | 714/30 |
| 2007/0011048 A1* | 1/2007 | Naito | 705/14 |

FOREIGN PATENT DOCUMENTS

| | | |
|---|---|---|
| WO | WO0182024 | 11/2001 |
| WO | WO0207116 | 1/2002 |

OTHER PUBLICATIONS

Surface PC: Microsoft rediscovers innovation—at ZDNet.co.uk http://resources.zdnet.co.uk/articles/features/0,1000002000,39288196,00.htm.*

Kris Abel's Tech Life :: Hands-On With Microsoft's Surface Interactive Table http://krisabel.ctv.ca/blog/Prototypes/_archives/2007/9/20/3242685.html.*

UbiTable: Impromptu Face-to-Face Collaboration on Horizontal Interactive Surfaces Katherine E veritt TR2003-49 Sep. 2003.*

Want, Roy, et al., "Bridging Physical and Virtual Worlds with Electronic Tags", CHI 99 May 15-20, 1999, pp. 370-377.

Kindberg, Tim, "Implementing Physical Hyperlinks Using Ubiquitous Identifier Resolution", 11th International World Wide Web Conference, May 7-11, 2002, Honolulu, HI.

Ljungstrand, Peter, et al., "WebStickers: Using Physical Tokens to Access, Manage and Share Bookmarks to the Web", Elsinore, Denmark, Apr. 12-14, 2000.

* cited by examiner

PURCHASING USING A PHYSICAL OBJECT

BACKGROUND

Background and Relevant Art

Computers and computing systems have affected nearly every aspect of modern living. Computers are generally involved in work, recreation, healthcare, transportation, entertainment, household management, etc.

Computers have also been involved in conducting various monetary transactions. For example, nearly all modern cash registers are computerized appliances used for calculating the cost of goods and services and for facilitating payment for the goods and services. Additionally, computers can be used for remote purchasing such as by allowing a consumer to order goods and services through Internet based interfaces.

In the cash register example, a user typically must interact with a cashier or sales person. While generally acceptable, the user experience is nonetheless often dictated by the efficiency or knowledge of the cashier or sales person. The cashiers or sales person may be inefficient resulting in delays to the user. The cashier may be unknowledgeable about goods or services resulting in incorrect purchases or the inability to purchase a desired good or service.

In the Internet purchasing example, a user may not have the ability to see and inspect goods prior to purchase. Additionally, a user's ability to select goods and services is often tied to the savvyness of the user, and the user's ability to appropriately select such goods and services.

The subject matter claimed herein is not limited to embodiments that solve any disadvantages or that operate only in environments such as those described above. Rather, this background is only provided to illustrate one example of a technology area where some embodiments described herein may be practiced.

BRIEF SUMMARY

One embodiment described herein includes a method of using a user interface to allow payment for physical or virtual goods to be made through a physical object. The method may be practiced, for example, in a computing system including a user interface. The method includes detecting a payment physical object, and payment capabilities associated with the payment physical object. User input is received. The user input includes graphically dragging a physical or a virtual object to the detected payment physical object by dragging a graphical representation of the physical or the virtual object to the detected payment physical object. Payment for the physical or virtual object is facilitated using the payment capabilities associated with the payment physical object.

Another embodiment described herein includes a method of using a user interface to allow payment for physical or virtual goods to be made through a physical object. The method may be practiced, for example, in a computing system including a user interface. The method includes receiving user input. The user input includes graphically dragging a physical or a virtual object to the payment area by dragging a graphical representation of the physical or the virtual object to the payment area on the interactive surface. A payment physical object is detected. Payment capabilities are associated with the payment physical object. The payment capabilities associated with the payment physical object are detected. Payment for the physical or virtual object is facilitated using the payment capabilities associated with the payment physical object.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to purchasing physical or virtual goods or services using a physical object. Embodiments may include a special purpose or general-purpose computer including various computer hardware, as discussed in greater detail below.

In one embodiment, the physical object may have associated with it certain payment capability characteristics. For example, the physical object may have a stored monetary value associated with it. Goods or services can be purchased against the stored monetary value. The physical object may be any one of a number of different objects such as a gift card, a souvenir, a digital music player, a personal digital assistant (PDA), a cellular telephone, a membership card, a loyalty card, a badge, a wristband, etc.

In one embodiment, goods or services can be purchased by "dragging" either a physical object or a virtual representation of an object to the physical object with the associated payment capability characteristics. The dragging may be accomplished through the use of a user interface such as a graphical user interface implemented in an interactive surface. The physical object may include a barcode tag or other item such as a Radio Frequency Identifier (RFID) tag that allows the interactive surface to sense and identify the physical object.

Figure 1:
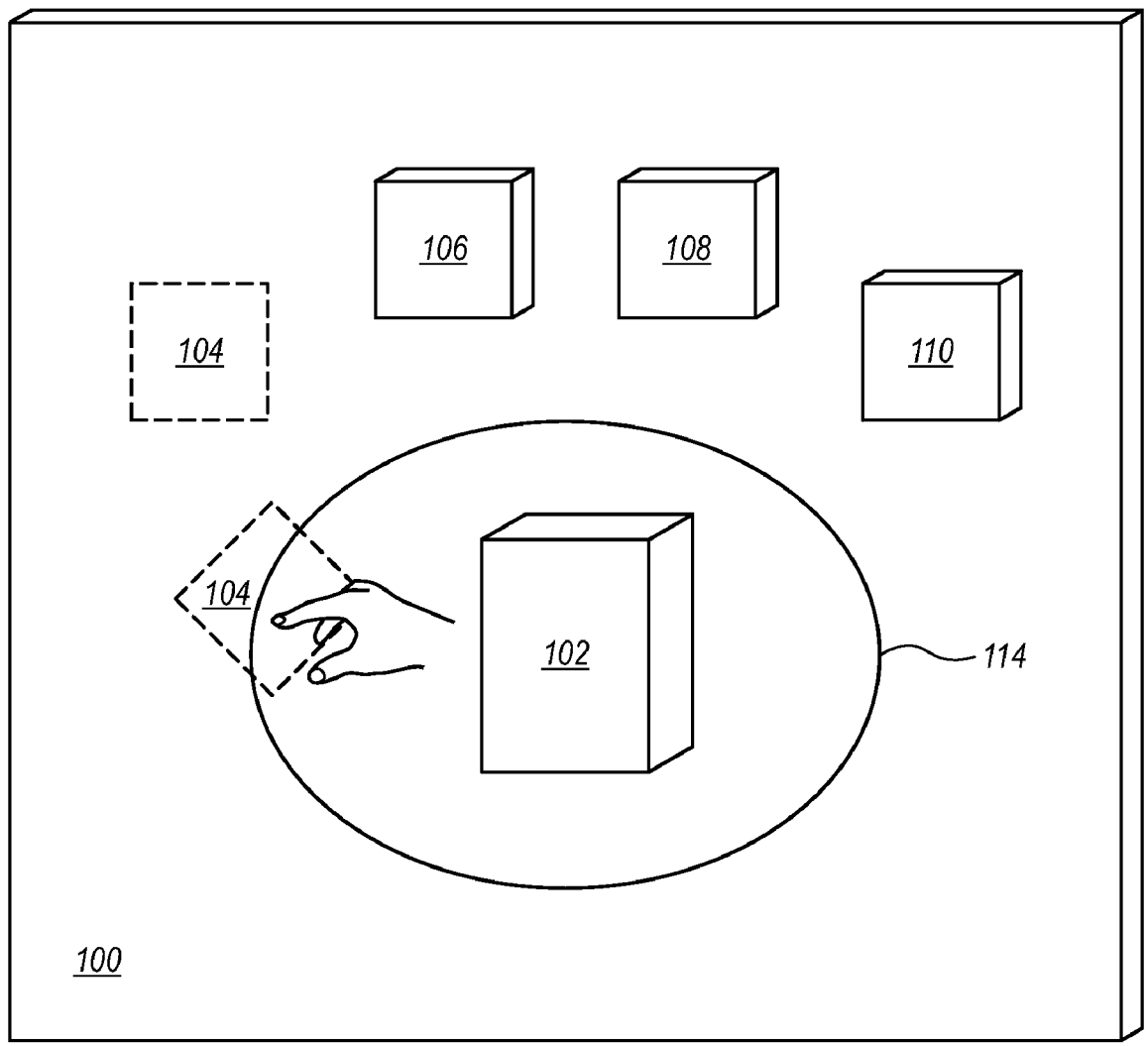
FIG. 1 illustrates an example interactive surface and virtual and physical objects.

Referring now to FIG. 1, an example of such an interface is illustrated. For example, FIG. 1 illustrates an interactive surface 100. In the example illustrated in FIG. 1, a user places a physical object 102 on the interactive service 100. The interactive surface 100 detects the presence of the physical object 102. The interactive surface 100 may also detect payment capability characteristics associated with the physical object 102.

FIG. 1 further illustrates a number of virtual objects 104, 106, 108, and 110. The virtual objects 104, 106, 108, and 110 are graphically displayed on the interactive surface 100. The virtual objects 104, 106, 108, and 110 may be graphical representations of physical objects or virtual objects such as downloadable content or purchasable services. To purchase goods or services, a user may drag the virtual object to the physical object 102. As illustrated, in this example, the user drags the virtual object 104 to the physical object 102 using a touch screen interface as illustrated by the hand image 114. Notably, any appropriate interface may be used including but not limited to a stylus, a mouse pointer cursor, human appendages such as hands or fingers, or any other appropriate interface.

When a user drags a virtual object 104 to the physical object 102, the user can purchase the good or service represented by the virtual object 104 by purchasing against the payment capability characteristics of the physical object 102. As explained previously, the payment capability characteristics associated with the physical object 102 may be for example a stored value, such as a stored monetary value, or a stored point value. In an alternative embodiment, the payment capability characteristics may include a link to an account such as an account that provides for monthly billing, a credit card account, a bank account, an online payment account, etc. Alternatively, the payment capabilities may be associated with an overall cumulative bill such as for a conference, vacation package, or other bill.

Delivery of the good or service represented by the virtual object 104 dragged to the physical object 102 may be accomplished in a number of different ways. For example, if the good or service represented by the virtual object 104 is something that can be applied to the physical object 102, the good or service may be immediately applied to the physical object 102. For example, if the physical object 102 is a digital music player, such as an MP3 player, and the virtual object 104 represents a musical work, the musical work represented by the virtual object 104 may be downloaded immediately to the MP3 player represented by the physical object 102. Similarly, ringtones may be purchased for cellular telephones, maps may be purchased for PDAs or GPS devices, photographs may be purchased for cameras, videos may be purchased for video player devices, games may be purchased for video game systems, ebooks may be purchased for PDAs or ebook readers, software may be purchased for computer systems, etc.

In an alternative embodiment, if the good or service represented by the virtual object 104 is downloadable from a service, the good or service can be retrieved from the download service. In yet another alternative embodiment, a user may be able to retrieve a good or service from a redemption location. For example, if the user uses the physical object 102 to make purchases at an amusement park, the user may be able to retrieve the goods and services purchased throughout the day using the physical object 102 at the conclusion of the day by retrieving all purchased goods and services from a redemption location at the exit of the amusement park.

In yet another alternative embodiment, payment using the physical object 102 may be performed for goods and services already received. For example, in a restaurants setting, diners may be able to select which menu items of a total bill were consumed by a particular diner or which will be paid for by a particular diner. The user can drag a virtual object 104 which represents one or more menu items to the physical object 102 such that payment for the particular menu item(s) represented by the virtual object 104 can be effected through use of the physical object 102.

Additionally, FIG. 1 illustrates a physical object 112. In one embodiment, a user can physically drag the physical object 112 to the physical object 102. The act of dragging the physical object 112 to the physical object 102 will allow the physical object 112 to be purchased against the payment capabilities associated with the physical object 102. Illustratively, the physical object 102 may be a cellular telephone. A user may desire to purchase accessories for the cellular telephone. The user places the cellular telephone as the physical object 102 on the interactive surface 100. The user is then able to physically place accessories represented by the physical object 112 by the physical object 102. This allows the accessories represented by the physical object 112 to be purchased against the payment capability characteristics of the physical object 102.

Embodiments may be further implemented which facilitate transmitting information to users or facilitate marketing endeavors. For example, the interactive surface 100 may include programmatic code which allows virtual objects 104, 106, 108, and 110 to be displayed depending on a number of different attributes associated with the physical object 102. For example, if the physical object 102 is a cellular telephone, the virtual objects 104, 106, 108, and 110 may represent items purchasable for the cellular telephone. For example, virtual objects may represent ringtones, headset accessories, charging accessories, etc. The virtual objects may also represent additional services such as test messaging services, additional minutes, new plans, etc.

Additionally, the interactive surface 100 may include programmatic code for directed marketing. Illustratively, the physical object 102 will likely be associated with a particular consumer. Based on a particular consumers previous purchases, or other behavioral trends, the interactive service 100 can suggest products and services that may be of interest to the particular consumer associated with the physical object 102. This may be done by presenting virtual objects which are of interest to the particular consumer.

Embodiments may also be implemented where virtual objects become associated with physical objects. For example, when any of the virtual objects 104, 106, 108 and 110 are purchased by dragging them to the physical object 102, the purchased virtual objects may become associated with the physical object 102. Thus for example, in one embodiment the physical object 102 may be redeemed for goods or services represented by virtual objects purchased using the physical object 102. In an alternative embodiment, virtual objects may become associated with the physical object 102 such that the virtual objects can be later accessed through the physical object 102. For example, a souvenir may be purchased at an amusement park. The souvenir is the physical object 102. The physical object 102 can be used to purchase story lines, memories associated with visiting particular parts of the amusement park, pictures, sounds, etc. The physical object 102 as a souvenir may be accessed such that the story lines, pictures, sounds and so forth may be accessed through the physical object 102. This allows for the creation of a souvenir which may include the most relevant or desirable memorabilia. In one embodiment, the physical object 102 may include computer memory for storing objects associated with the physical object 102. In an alternative embodiment, the physical object may include electronic capabilities for permitting access to objects over a network connection.

Embodiments may also allow for payment capability characteristics of the physical object 102 to be changed. For example, in one embodiment, a user can add additional prepaid funds to a physical object 102 by dragging a virtual object representing funds to the physical object 102. For example, in one embodiment, a user may use a physical object presented to an interactive surface 100 at a bank which allows the user to view account information for the user at the bank. The account information may be displayed in virtual object representation such that funds from an account can be dragged using virtual objects to the physical object 102 such that additional funds can be added to the physical object for subsequent purchases.

The following illustrates a number of examples which are not intended to be exhaustive of the examples that maybe practiced but which nonetheless convey a number of example embodiments within the scope of embodiments of the present invention.

Bank Accounts—Physical objects such as the physical object 102 may be used to manage a bank account. In one embodiment, a banking card may be used as the physical object 102. In another example, other items such as for example a piggy bank may be used for managing the bank account. In one embodiment, a card or piggy bank may be placed on an interactive surface at a bank. An interface appears indicating account amounts in one or more accounts for a user at the bank. Funds can be counted out of one or more accounts and dragged into the card or piggy bank. The card or piggy bank can then be later used to purchase goods or services from other merchants implementing the interactive surface interface.

Tourist Experiences—Various souvenir embodiments may be implemented. For example, in one embodiment a souvenir may be purchased at an amusement park. Other souvenirs can be purchased by dragging physical or virtual objects to the originally purchased souvenir. Pictures taken at rides can be purchased by dragging the pictures to the purchased souvenir. Items purchased with the purchased souvenir including other souvenirs and pictures can be retrieved at the exit gate so that the user does not need to carry around purchased items throughout the day. Food purchases at the amusement park may be purchased using the purchased souvenir. Games may be purchased using the souvenir. Videos and music presented at the amusement park may be available for purchase by placing the souvenir on an interactive surface near where the video or music is being presented which allows for purchase of the video or music which may then be later downloaded.

In another souvenir example, the physical goods may be purchased using physical or virtual object dragging. Food and drinks may be purchased by an interactive dragging interface. Movies may be purchased through interactive dragging. Even taxi services, hotel services, and other amusement services can be purchased using a physical object by dragging virtual objects representing those services to the physical object.

Events—In another embodiment, event credentials may be used for the purchase of goods and services. For example, an identification badge card or event bracelet may be used for various purchases. For example, an amount may be stored to the badge or bracelet which can then be used throughout the event to pay for items such as class admissions materials, souvenir items, food items, photographs, etc.

Specialty Purchases—In another embodiment, specialty purchases may be made. For example, a music store may include an interactive surface that is configured to interact with a digital music player. As described above, the user can place the digital music player on the interactive surface. The interactive surface may then suggest certain music or other content for download, which would be presented as virtual objects. Similarly, a cell phone vendor may allow a user to purchase ringtones, display skins, upgraded service plans, additional services, additional minutes, etc. Each of these can be purchased by dragging virtual items to a physical item on an interactive surface. In one embodiment, a stored amount is not necessarily associated with the cell phone as the physical object, but rather a monthly bill may be linked to the physical object such that services can be billed through the monthly bill. In a similar embodiment, prints of digital photos can be ordered by interacting with an interactive surface were the physical object is a digital camera. The virtual objects may be filters, print sizes, or other digital photo services. Similar embodiments may also be implemented for video game systems, ebooks systems, PDA systems, GPS system etc.

Loyalty/Membership Cards—In another embodiment, loyalty or membership cards may be used to facilitate purchases. For example, values may be stored on loyalty are membership cards which may then be used to purchase goods or services from the issuing or affiliated entities. Similarly, key cards such as cards issued by hotels may be used to purchase goods and services.

While in the examples illustrated herein embodiments have been shown where objects are dragged to a physical object including payment capabilities, other embodiments allow the physical object including payment capabilities to be dragged to physical or virtual objects for purchase. For example, in the example illustrated in FIG. 1, virtual objects 104, 106, 108, and 110 or physical object 112 can be dragged to the payment area 114 of the interactive surface. The physical object 102 can then be physically dragged to the payment area causing payment to be made for any objects in the payment area.

Figure 2:
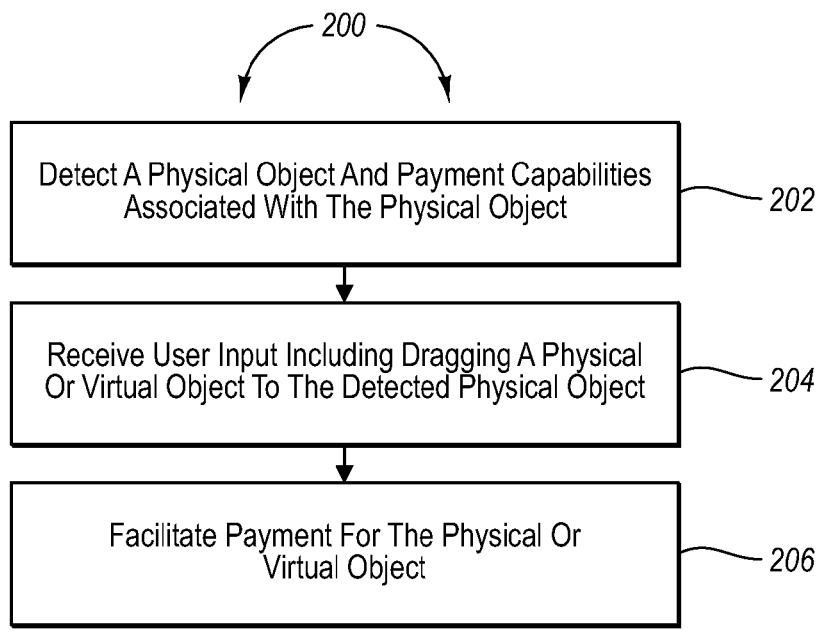
FIG. 2 illustrates a method of purchasing using a physical object.

Embodiments may include methods for accomplishing certain purchasing activities using a physical object. For example, referring to FIG. 2, a method 200 of using a user interface to allow payment for physical or virtual goods to be made through a physical object is illustrated. The method 200 includes detecting a physical object and payment capabilities associated with the physical object (act 202). Illustratively, in FIG. 1, the physical object 102 may include sensor tags, such as RFID, barcode, or other tags, which allow the physical object 102 to be detected by the interactive surface 100. The interactive surface 100 may be able to detect payment capabilities either by information included directly on a computer readable medium within the physical object 102, or through logical linking of the physical object 102 with stored information regarding the payment capabilities.

As illustrated in the examples previously set forth herein, the payment capabilities may be associated with an amount stored to the physical object 102. Alternatively, the payment capabilities may be information linking the physical object 102 to a billing account such that goods and services purchased using the physical object 102 can be paid for by periodic or other billing. Notably, in one embodiment, billing may be part of a package billing. For example, a consumer may receive a bill for a conference, tourist vacation, etc. Billing for items purchased using the physical object may be included in the bill.

Referring once again to FIG. 2, the method 200 includes receiving user input (act 204). The user input includes at least one of physically dragging a physical object to the detected physical object, or graphically dragging the physical or a virtual object to the detected physical object by dragging a graphical representation of the physical or the virtual object to the detected physical object. As illustrated in FIG. 1, virtual objects 104, 106, 108, and 110 can be dragged to the physical object 102 on the interactive service 100. Additionally, physical object 112 can be dragged to the physical object 102.

Dragging objects to the physical object 102 can be detected through various graphical interfaces, touch sensors, weight sensors, optical sensors, etc.

The method 200 further includes facilitating payment for the physical or virtual object using the payment capabilities associated with the physical object (act 206). For example, an amount may be deducted from a stored amount associated with the physical object 102. Alternatively, information may be sent to a billing system allowing for a bill to be sent to a user for goods or services purchased using the physical object 102.

The method 200 may include other acts which facilitate the use of the physical object for effecting purchases. For example, the method 200 may further include, in response to detecting the physical object, displaying one or more graphical representations of recommended objects for purchase. Several examples of this functionality are illustrated above. For example, a digital music player may be placed on an interactive surface. This may cause certain music titles to be displayed on the interactive service for purchase by a user. Alternatively, a cellular telephone may be placed on an interactive service. The interactive surface may then display accessories, upgraded plan options, ringtones, etc.

In one embodiment, the recommended objects for purchase may represent goods or services that can be purchased to qualify for bonus goods or services. For example, if a merchant has a bonus program, and a user will qualify for certain bonus goods or services, or become closer to being eligible for bonus goods or services by making certain purchases, the interactive surface can recommend those goods or services for purchase.

The method 200 may further include, in response to detecting the physical object, displaying one or more graphical representations of the payment capabilities. For example, a user may place a physical object on an interactive surface. The interactive service may then display an amount stored to the physical object. In an alternative embodiment, the interactive surface may display amounts in user accounts for the user of the physical object.

The method 200 may further include transmitting information about objects purchased using the detected physical object to a fulfillment location such that purchased objects may be obtained by a user of the detected physical object at the fulfillment location. As illustrated in the examples shown above, a user at an amusement park, conference, shopping location, etc, may have goods or services purchased using the physical object stored at a fulfillment center where the goods or services can be retrieved at the conclusion of the activities. This allows a user to purchase items without the need to carry the items throughout the day. Rather the user can collect any purchased items at the user's convenience.

The method 200 may further include transmitting information about objects purchased using the detected physical object to a fulfillment location such that purchased objects may be obtained by a user of the detected physical object by downloading the purchased objects from the fulfillment location. If the items purchased are downloadable, such as music, video, images, ringtones, etc. some embodiments may allow for the items to be stored at a location later accessible through a network computer interface which allows the user to retrieve the items electronically.

The method 200 may further include associating purchased physical or virtual objects with the detected physical object. This may allow for several different embodiments to be accomplished. For example, a user can create a souvenir which includes relevant memorabilia stored directly to the souvenir. Alternatively, this functionality may allow purchasing history to be associated with the physical object. Further still, this functionality may be used to allow a physical object used to purchase goods and services to be redeemed for those goods and services. As will be appreciated, other embodiments may also benefit from this functionality.

Figure 3:
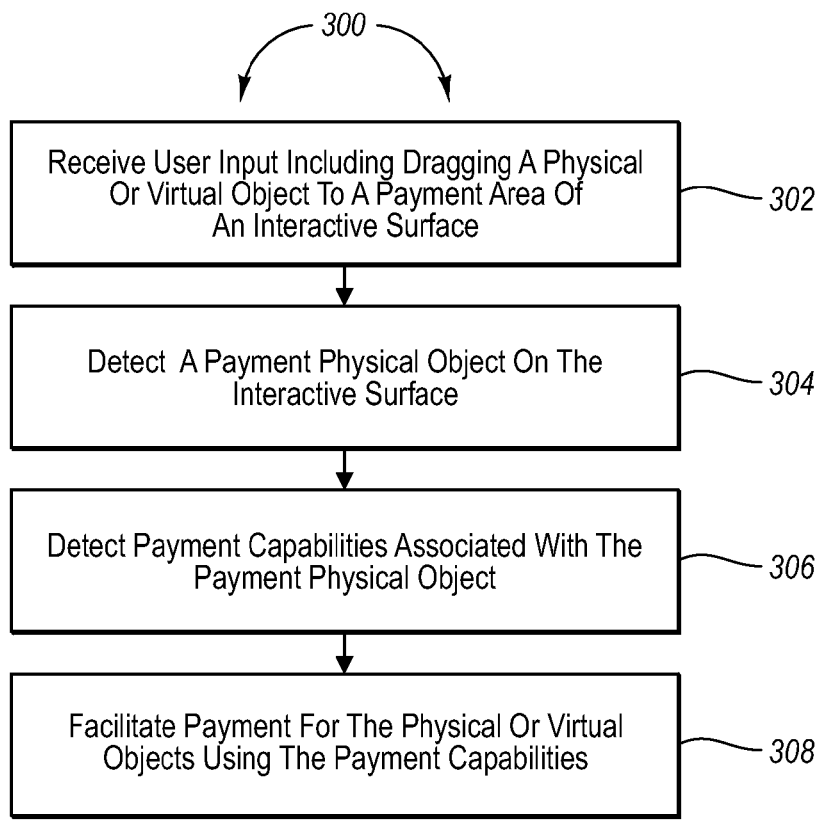
FIG. 3 illustrates an alternate method of purchasing using a physical object.

Referring now to FIG. 3, another embodiment is illustrated which includes method acts for purchase goods or services using a physical object. A method 300 is illustrated.

The method 300 includes receiving user input (act 302). The user input includes at least one of physically dragging a physical object to a payment area on the interactive surface, or graphically dragging the physical or a virtual object to the payment area by dragging a graphical representation of the physical or the virtual object to the payment. For example, as illustrated in FIG. 1, virtual objects 104, 106, 108, or 110 or physical object 112 can be dragged to the payment area 114.

The method 300 further includes detecting a payment physical object with payment capabilities associated with the payment physical object (act 304). For example, the physical object 103 may be placed on the interactive surface 100 at the payment area 114.

The method 300 further includes detecting the payment capabilities associated with the payment physical object (act 306). For example, payment capabilities, such as an amount stored to the payment physical object, a link to an account, or link to billing infrastructure may be detected.

The method 300 further includes facilitating payment for the physical or virtual object using the payment capabilities associated with the payment physical object (act 308). For example, amounts can be deducted from the amount stored to the payment physical object. Alternatively, billing information may be transmitted to a billing infrastructure for billing.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system including a user interface, a method of using the user interface to allow payment for physical or virtual goods to be made through a physical object, the method comprising:

detecting a payment physical object physically being placed on a portion of an interactive surface, detecting payment capabilities associated with the payment physical object; receiving user input at the interactive surface, the user input comprising at least one of physically dragging a physical object to the detected payment physical object physically on the portion of the interactive surface, graphically dragging a graphical representation of the physical object to the detected payment physical object, the detected payment physical object being physically on the portion of the interactive surface, or graphically dragging a graphical representation of a virtual object to the detected payment physical object physically on the portion of the interactive surface; and as a result of the user input at the interactive surface, including at least one of physically dragging the physical object to the detected payment physical objects, the detected payment physical object being physically on the portion of the interactive surface, graphically dragging a graphical representation of the physical object to the detected payment physical object physically on the portion of the interactive surface, or graphically dragging a graphical representation of a virtual object to the detected payment physical object, the detected payment physical object being physically on the portion of the interactive surface, facilitating payment for the physical or virtual object using the payment capabilities associated with the payment physical object.

2. The method of claim 1, further comprising, in response to detecting the payment physical object, displaying one or more graphical representations of recommended objects for purchase.

3. The method of claim 1, further comprising transmitting information about objects purchased using the detected payment physical object to a fulfillment location such that purchased objects may be obtained by a user of the detected payment physical object at the fulfillment location.

4. The method of claim 1, further comprising transmitting information about objects purchased using the detected payment physical object to a fulfillment location such that purchased objects may be obtained by a user of the detected payment physical object by downloading the purchased objects from the fulfillment location.

5. The method of claim 1, wherein receiving user input at the interactive surface comprises graphically dragging a graphical representation of the virtual object to the detected payment physical object, the detected payment physical object being physically on the portion of the interactive surface, the method further comprising applying the purchased virtual objects, to the detected payment physical object.

6. In a computing system including a user interface, a method of using the user interface to allow payment for physical or virtual goods to be made through a physical object, the method comprising:

receiving user input, the user input comprising graphically dragging a graphical representation of a physical object or a graphical representation of a virtual object to a payment area on an interactive surface by dragging a graphical representation of the physical or the virtual object to the payment area;

detecting a payment physical object with payment capabilities associated with the payment physical object being physically placed on the interactive surface in the payment area of the interactive surface;

detecting the payment capabilities associated with the payment physical object; and as a result of detecting the payment physical object with payment capabilities associated with the payment physical object being physically placed on the interactive surface in the payment area of the interactive surface, facilitating payment for the physical or virtual object using the payment capabilities associated with the payment physical object.

7. The method of claim 6, wherein the payment capabilities associated with the payment physical object comprise a monetary amount that can be spent.

8. The method of claim 6, wherein the payment capabilities associated with the payment physical object comprise an association with a billing system for providing a bill for objects purchased using the detected payment physical object.

9. The method of claim 8, wherein the bill is a monthly bill.

10. The method of claim 8, wherein the bill is a cumulative bill.

11. The method of claim 6, further comprising transmitting information about objects purchased using the payment physical object to a fulfillment location such that purchased objects may be obtained by a user of the payment physical object at the fulfillment location.

12. The method of claim 6, further comprising transmitting information about objects purchased using the payment physical object to a fulfillment location such that purchased objects may be obtained by a user of the payment physical object by downloading the purchased objects from the fulfillment location.

13. The method of claim 6, further comprising associating purchased physical or virtual objects with the payment physical object.

14. In a computing system including a user interface, a computer readable medium comprising computer executable instructions that when executed by a processor cause the processor to perform the following:

detecting a payment physical object physically on an interactive surface, wherein the payment physical object comprises a souvenir obtained at a tourist location;

detecting payment capabilities associated with the payment physical object;

receiving user input at the interactive surface for purchasing at least one of a physical object or a virtual object, the user input comprising at least one of physically dragging the physical object to the detected payment physical objects, the detected payment physical object being physically on the interactive surface, graphically dragging a representation of the physical object to the detected payment physical object physically on the interactive surface, or graphically dragging a graphical representation of a virtual object to the detected payment physical object, the detected payment physical object being physically on the interactive surface; and as a result of receiving user input at the interactive surface for purchasing at least one of the physical object or the virtual object, including at least one of physically dragging the physical object to the detected payment physical object, the detected payment physical object being physically on the interactive surface, graphically dragging a representation of the physical object to the detected payment physical object physically on the interactive surface, or graphically dragging a graphical representation of a virtual object to the detected payment physical object, the detected payment physical object being physically on the interactive surface, facilitating payment for the physical or virtual object using the payment capabilities associated with the payment physical object; and transmitting information about the physical object or virtual object to a fulfillment location at an exit of the tourist location where the physical object or virtual object can be retrieved at the conclusion of activities at the tourist location.

15. The computer readable medium of claim 14, wherein the computer readable medium is a physical computer readable medium.

* * * * *